US009880512B2

(12) United States Patent
Shimizu et al.

(10) Patent No.: US 9,880,512 B2
(45) Date of Patent: Jan. 30, 2018

(54) IMAGE FORMING APPARATUS INCLUDING AN OUTER COVER AND A SUBSIDIARY COVER

(71) Applicants: Keiichi Shimizu, Kanagawa (JP);
Hiroki Ishimitsu, Kanagawa (JP);
Kazuyuki Ito, Kanagawa (JP);
Takayuki Nishi, Kanagawa (JP);
Katsuhiro Hoshi, Kanagawa (JP);
Yoshihide Ohta, Kanagawa (JP);
Nobuhiro Shima, Kanagawa (JP)

(72) Inventors: Keiichi Shimizu, Kanagawa (JP);
Hiroki Ishimitsu, Kanagawa (JP);
Kazuyuki Ito, Kanagawa (JP);
Takayuki Nishi, Kanagawa (JP);
Katsuhiro Hoshi, Kanagawa (JP);
Yoshihide Ohta, Kanagawa (JP);
Nobuhiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/227,504

(22) Filed: Aug. 3, 2016

(65) Prior Publication Data
US 2017/0060075 A1  Mar. 2, 2017

(30) Foreign Application Priority Data
Aug. 28, 2015  (JP) ................. 2015-169510

(51) Int. Cl.
G03G 15/00 (2006.01)
G03G 21/16 (2006.01)
H04N 1/00 (2006.01)

(52) U.S. Cl.
CPC ....... *G03G 21/1619* (2013.01); *H04N 1/0083* (2013.01); *H04N 1/00551* (2013.01); *H04N 2201/0094* (2013.01)

(58) Field of Classification Search
CPC .......... G03G 21/1619; H04N 1/00551; H04N 1/0083; H04N 2201/0094
See application file for complete search history.

(56) References Cited

U.S. PATENT DOCUMENTS

| 8,810,833 B2 * | 8/2014 | Suzuki | G03G 15/80 347/138 |
|---|---|---|---|
| 2008/0286993 A1 | 11/2008 | Ito | |
| 2015/0071676 A1 * | 3/2015 | Imoto | G03G 15/60 399/90 |
| 2016/0161904 A1 | 6/2016 | Matsuda et al. | |

FOREIGN PATENT DOCUMENTS

| JP | 9-292815 | 11/1997 |
|---|---|---|
| JP | 10-117070 | 5/1998 |
| JP | 2003-146522 | 5/2003 |
| JP | 2006-349849 | 12/2006 |
| JP | 2008-310290 | 12/2008 |

* cited by examiner

*Primary Examiner* — Hoang Ngo
(74) *Attorney, Agent, or Firm* — Harness, Dickey & Pierce, P.L.C.

(57) ABSTRACT

An image forming apparatus includes an electric wire and an electric box. The electric box extends substantially horizontally and includes a wire connector coupled to the electric wire. A body face exposes the wire connector. An outer cover covers the body face. The outer cover includes a slot and a wire accommodator. The slot is disposed opposite the wire connector to expose the wire connector to an outside of the image forming apparatus. The wire accommodator accommodates the electric wire.

20 Claims, 8 Drawing Sheets

IMAGE FORMING APPARATUS INCLUDING AN OUTER COVER AND A SUBSIDIARY COVER

CROSS-REFERENCE TO RELATED APPLICATION

This patent application is based on and claims priority pursuant to 35 U.S.C. §119 to Japanese Patent Application No. 2015-169510, filed on Aug. 28, 2015, in the Japanese Patent Office, the entire disclosure of which is hereby incorporated by reference herein.

BACKGROUND

Technical Field

Example embodiments generally relate to an image forming apparatus, and more particularly, to an image forming apparatus for forming an image on a recording medium.

Background Art

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such image forming apparatus may include an electric box to drive various components incorporated in the image forming apparatus including the above-described components used to form the toner image on the recording medium. The electric box is coupled to a plurality of wires connected to the components used to form the toner image on the recording medium.

SUMMARY

At least one embodiment provides a novel image forming apparatus that includes an electric wire and an electric box. The electric box extends substantially horizontally and includes a wire connector coupled to the electric wire. A body face exposes the wire connector. An outer cover covers the body face. The outer cover includes a slot and a wire accommodator. The slot is disposed opposite the wire connector to expose the wire connector to an outside of the image forming apparatus. The wire accommodator accommodates the electric wire.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
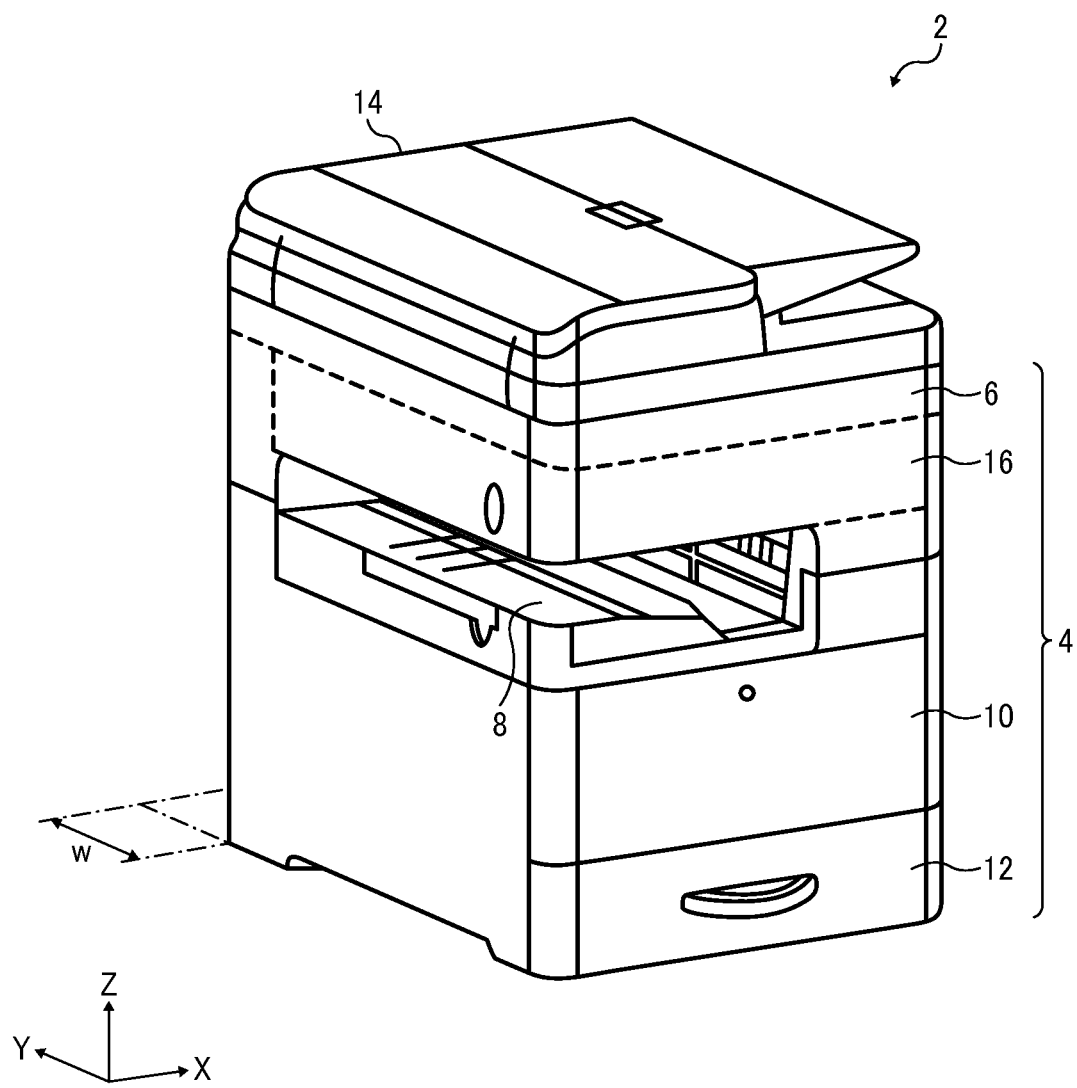
FIG. 1 is an external perspective view of a monochrome image forming apparatus according to an example embodiment of the present disclosure.

The accompanying drawings are intended to depict example embodiments and should not be interpreted to limit the scope thereof. The accompanying drawings are not to be considered as drawn to scale unless explicitly noted.

DETAILED DESCRIPTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein are interpreted accordingly.

Although the terms first, second, and the like may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 2 according to an example embodiment is explained.

FIG. 1 is an external perspective view of the image forming apparatus 2. The image forming apparatus 2 may be a copier, a facsimile machine, a printer, a multifunction peripheral or a multifunction printer (MFP) having at least one of copying, printing, scanning, facsimile, and plotter functions, or the like. According to this example embodiment, the image forming apparatus 2 is a monochrome copier that forms a monochrome toner image on a recording medium by electrophotography. Alternatively, the image forming apparatus 2 may be a color copier that forms a color toner image on a recording medium. Yet alternatively, the image forming apparatus 2 may form an image on a recording medium by inkjet printing.

Referring to FIG. 1, a description is provided of a construction of the image forming apparatus 2.

As illustrated in FIG. 1, the image forming apparatus 2 includes an auto document feeder (ADF) 14 and a body 4. The body 4 includes a scanner 6, an electric box 16, an output tray 8, an image forming device 10, and a paper tray 12. The scanner 6 is disposed in an upper portion of the body 4 and serves as an image reader that reads an image on an original. The output tray 8 is disposed in the upper portion of the body 4 and below the scanner 6. The output tray 8 serves as a sheet output portion or a sheet receiver that receives a sheet bearing a toner image that is ejected from the image forming device 10. Below the output tray 8 are the image forming device 10 and the paper tray 12 detachably attached to the body 4. Above the scanner 6 is the ADF 14 serving as an automatic document feeder that automatically feeds the original to the scanner 6. Alternatively, the image forming apparatus 2 may also serve as a printer in which the image forming device 10 forms an image on a sheet according to image data sent from an external device such as a client computer. Yet alternatively, the image forming apparatus 2 may also serve as a facsimile machine.

Figure 2:
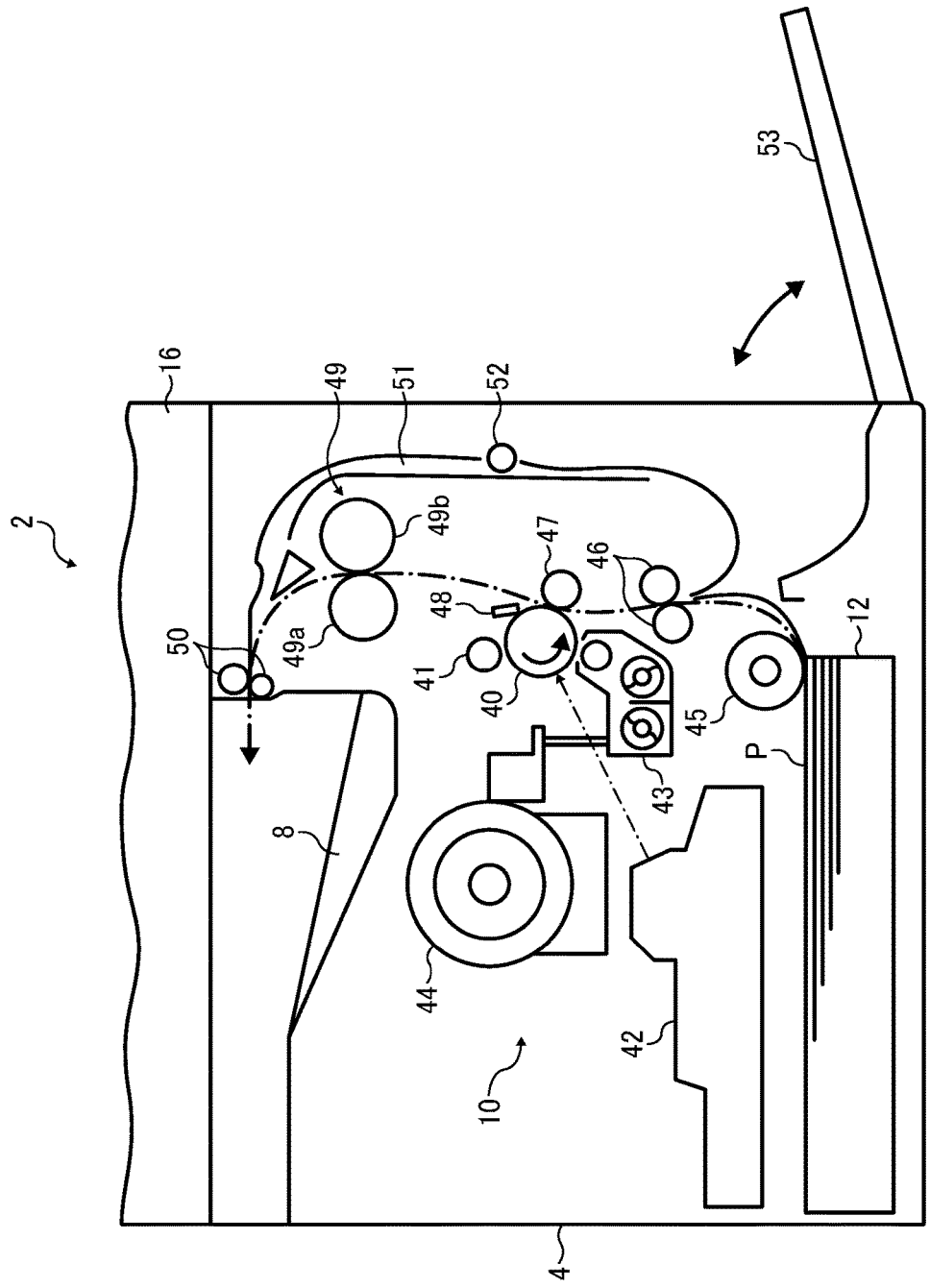
FIG. 2 is a schematic vertical cross-sectional view of the image forming apparatus illustrated in FIG. 1.

Referring to FIG. 2, a description is provided of a construction of the image forming device 10.

FIG. 2 is a schematic vertical cross-sectional view of the image forming apparatus 2. The image forming device 10 includes a photoconductive drum 40 serving as an image bearer. A charger 41 uniformly changes an outer circumferential surface of the photoconductive drum 40. An exposure device 42 forms an electrostatic latent image on the photoconductive drum 40 according to image data. A developing device 43 visualizes the electrostatic latent image as a toner image. A feed roller 45 picks up and feeds a sheet P serving as a recording medium from the paper tray 12 to a registration roller pair 46. The registration roller pair 46 conveys the sheet P to a transfer nip formed between the photoconductive drum 40 and a transfer device 47 at a predetermined time when the toner image formed on the photoconductive drum 40 reaches the transfer nip. The transfer device 47 transfers the toner image formed on the photoconductive drum 40 onto the sheet P.

After the transfer of the toner image from the photoconductive drum 40 onto the sheet P, a cleaner 48 removes residual toner and the like failed to be transferred onto the sheet P and therefore remaining on the outer circumferential surface of the photoconductive drum 40 therefrom. A fixing device 49 including a fixing roller 49a heated by a heater and a pressure roller 49b, for example, fixes the toner image on the sheet P. An output roller pair 50 ejects the sheet P bearing the fixed toner image onto the output tray 8. If a print job requests duplex printing to form a toner image on both sides of the sheet P, the output roller pair 50 rotates reversely to convey the sheet P to a conveyance path 51 such that a trailing edge of the sheet P having been conveyed from the fixing device 49 to the output roller pair 50 becomes a leading edge of the sheet P conveyed from the output roller pair 50 to the conveyance path 51. A conveyance roller 52 conveys the sheet P to the registration roller pair 46 which conveys the sheet P to the transfer nip at a predetermined time when another toner image formed on the photoconductive drum 40 reaches the transfer nip. A bypass tray 53, which is opened and closed with respect to the body 4, loads one or more sheets P. A toner bottle 44 serves as a toner supply that supplies fresh toner to the developing device 43.

The image forming apparatus 2 depicted in FIG. 2 is a monochrome image forming apparatus that forms a monochrome toner image on a sheet P. Alternatively, the image forming apparatus 2 may be a color image forming apparatus that forms a color toner image on a sheet P as illustrated in FIG. 3.

A description is provided of a construction of an image forming apparatus 2S serving as a color image forming apparatus.

Figure 3:
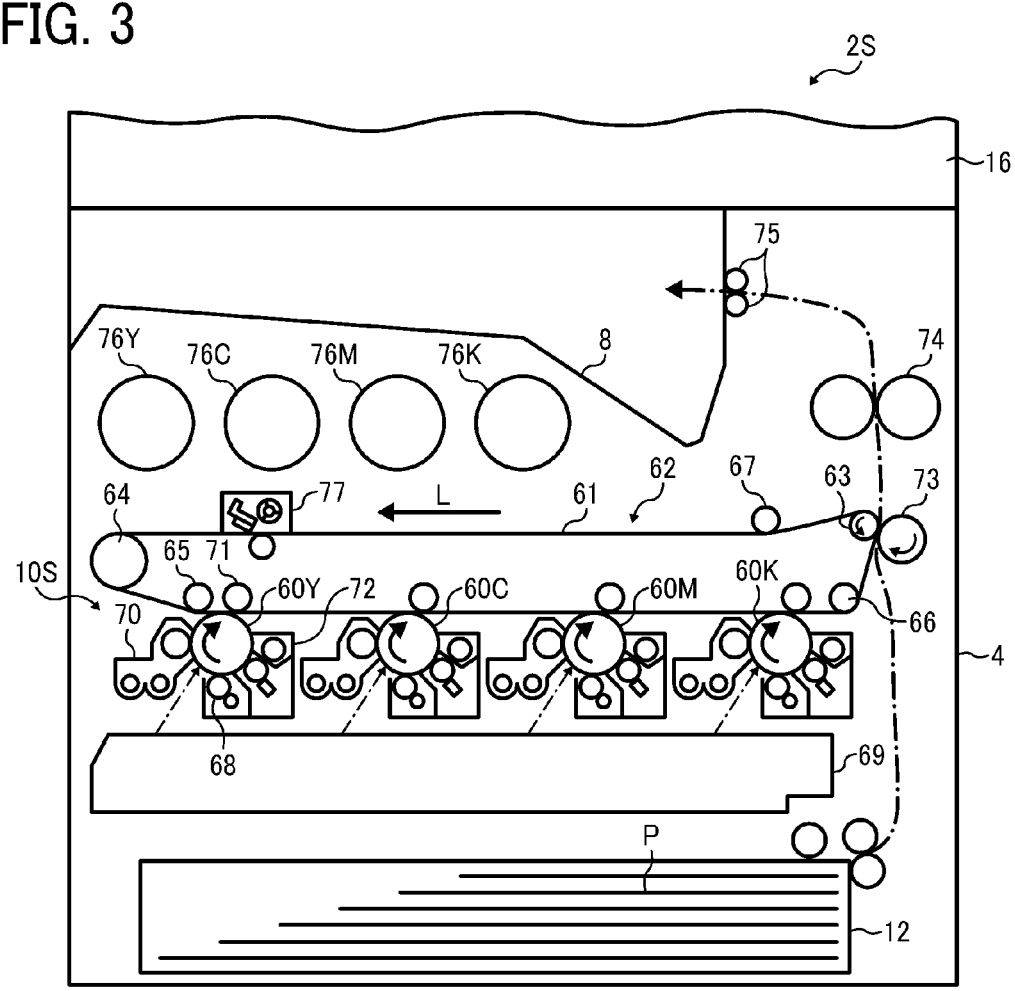
FIG. 3 is a schematic vertical cross-sectional view of a color image forming apparatus according to another example embodiment of the present disclosure.

FIG. 3 is a schematic vertical cross-sectional view of the image forming apparatus 2S. As illustrated in FIG. 3, the image forming apparatus 2S includes a tandem image forming device 10S including four image forming units (e.g., process cartridges) aligned horizontally in FIG. 3. The four image forming units include four photoconductive drums 60Y, 60C, 60M, and 60K serving as image bearers, respectively. Suffixes Y, C, M, and K denote yellow, cyan, magenta, and black, respectively, as colors of a developer used to form a toner image. An intermediate transfer unit 62 is disposed opposite the photoconductive drums 60Y, 60C, 60M, and 60K of the image forming units, respectively. The intermediate transferor unit 62 includes an intermediate transfer belt 61 (e.g., an endless belt) serving as an intermediate transferor. The intermediate transfer belt 61 is rotatably looped over a plurality of support rollers 63, 64, 65, and 66.

As the support roller 63 serving as a driving roller is driven and rotated counterclockwise in FIG. 3, the intermediate transfer belt 61 is driven and rotated in a rotation direction L. A tension roller 67 presses against an outer circumferential surface of the intermediate transfer belt 61 to exert tension to the intermediate transfer belt 61. The photoconductive drums 60Y, 60C, 60M, and 60K are driven and rotated clockwise in FIG. 3 while the photoconductive drums 60Y, 60C, 60M, and 60K contact the outer circumferential surface of the intermediate transfer belt 61. A charging roller 68 charges the outer circumferential surface of the first photoconductive drum 60Y disposed upstream from the photoconductive drums 60C, 60M, and 60K in the rotation direction L of the intermediate transfer belt 61 at a predetermined polarity. An optical writing unit 69 serving as an exposure device emits an optically modulated laser beam onto the charged outer circumferential surface of the photoconductive drum 60Y. Thus, an electrostatic latent image is formed on the first photoconductive drum 60Y. A developing device 70 visualizes the electrostatic latent image as a yellow toner image. As a primary transfer roller 71 is applied with a transfer voltage, the primary transfer roller 71 primarily transfers the yellow toner image formed on the photoconductive drum 60Y onto the outer circumferential surface of the intermediate transfer belt 61 driven and rotated in the rotation direction L. After the primary transfer of the yellow toner image from the photoconductive drum 60Y onto the intermediate transfer belt 61, a cleaner 72 removes residual toner failed to be transferred onto the intermediate transfer belt 61 and therefore remaining on the outer circumferential surface of the photoconductive drum 60Y therefrom.

Similarly, cyan, magenta, and black toner images are formed on the second photoconductive drum 60C, the third photoconductive drum 60M, and the fourth photoconductive drum 60K, respectively, and primarily transferred onto the intermediate transfer belt 61 successively such that the cyan, magenta, and black toner images are superimposed on the yellow toner image on the intermediate transfer belt 61. Thus, the yellow, cyan, magenta, and black toner images superimposed on the intermediate transfer belt 61 constitute a color toner image. The paper tray 12 serving as a sheet feeder is disposed in a lower portion of the body 4. As a registration roller pair rotates, the registration roller pair conveys a sheet P sent from the paper tray 12 to a secondary transfer nip formed between the intermediate transfer belt 61 and a secondary transfer roller 73 at a predetermined time when the color toner image formed on the intermediate transfer belt 61 reaches the secondary transfer nip. The secondary transfer nip is formed between a portion of the intermediate transfer belt 61 that is supported by the support roller 63 and the secondary transfer roller 73 disposed opposite the support roller 63. As the secondary transfer roller 73 is applied with a transfer voltage, the secondary transfer roller 73 secondarily transfers the yellow, cyan, magenta, and black toner images superimposed on the intermediate transfer belt 61 onto the sheet P collectively. The secondary transfer roller 73 is pressed against the support roller 63 via the intermediate transfer belt 61. The secondary transfer roller 73 is driven and rotated clockwise in FIG. 3 while the secondary transfer roller 73 contacts the outer circumferential surface of the intermediate transfer belt 61.

The sheet P bearing the color toner image is conveyed to a fixing device 74 that fixes the color toner image on the sheet P under heat and pressure. An output roller pair 75 ejects the sheet P conveyed from the fixing device 74 onto the output tray 8 that stacks the sheet P. Toner bottles 76Y, 76C, 76M, and 76K supply fresh yellow, cyan, magenta, and black toners to the developing devices 70, respectively. After the secondary transfer, residual toner failed to be transferred onto the sheet P remains on the intermediate transfer belt 61. The intermediate transfer unit 62 further includes a belt cleaner 77 that removes the residual toner from the intermediate transfer belt 61.

FIG. 3 illustrates the image forming apparatus 2S employing a tandem intermediate transfer method. Alternatively, the image forming apparatus 2S may employ a tandem direct transfer method or a construction in which a plurality of developing devices surrounds a single photoconductive drum.

A description is provided of a construction of a first comparative image forming apparatus.

The first comparative image forming apparatus includes a first comparative electric box mounted on a rear face of the first comparative image forming apparatus and extended vertically from a position in proximity to a floor to facilitate assembly and maintenance. Alternatively, if the first comparative image forming apparatus is a desktop machine that saves space, the first comparative electric box may extend horizontally to reduce a location area where the first comparative image forming apparatus is located. For example, the first comparative electric box is disposed in a lower portion of a body of the first comparative image forming apparatus and between a paper tray and an image forming device such that the first comparative electric box is attachable and detachable from the body horizontally.

However, the first comparative electric box accommodating a controller and extending horizontally may complex access of a service engineer to the first comparative electric box and increase the number of processes performed by the service engineer during maintenance compared to the first comparative electric box extending vertically. Additionally, the first comparative electric box extending horizontally may cause cables and the like crept from the controller of the first comparative electric box to align horizontally and hang down, degrading the external appearance of the first comparative image forming apparatus.

A description is provided of a construction of a second comparative image forming apparatus incorporating a second comparative electric box extending vertically and a relation between the second comparative electric box and a location area where the second comparative image forming apparatus is located.

The second comparative electric box accommodates a plurality of substrates that controls various electric or electronic parts, such as a motor, a solenoid, and a sensor, situated inside the second comparative image forming apparatus. The plurality of substrates is secured to the second comparative electric box with screws and the like. A driving unit incorporates a motor and a gear box that control and drive rollers and belts that constitute a layout of parts used to convey a sheet and form a toner image. The driving unit is mounted on a rear face of a body of the second comparative image forming apparatus. The second comparative electric box is mounted on a rear face of the driving unit.

Figure 4:
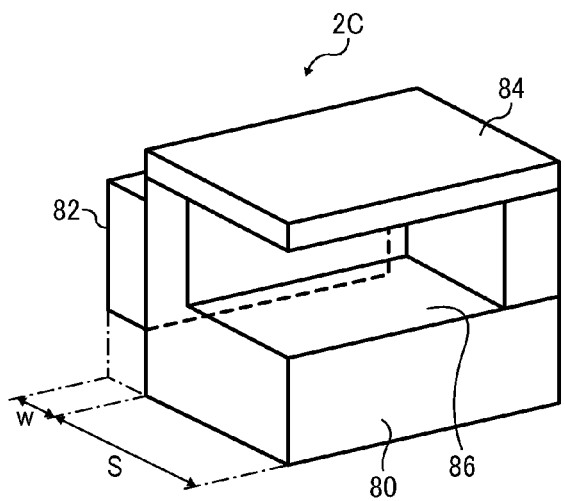
FIG. 4 is a perspective view of a comparative image forming apparatus.

FIG. 4 is a perspective view of a second comparative image forming apparatus 2C incorporating a second comparative electric box 82. As illustrated in FIG. 4, the second comparative electric box 82 is mounted on a rear face of the second comparative image forming apparatus 2C that is opposite a front face 80 serving as an operation face facing a user who uses the second comparative image forming apparatus 2C. The second comparative electric box 82 extends vertically. The second comparative image forming apparatus 2C further includes a scanner 84 and an output tray 86. The second comparative image forming apparatus 2C has a length S in a depth direction of the second comparative image forming apparatus 2C. The driving unit and the second comparative electric box 82 mounted on the rear face of the driving unit increase a depth of the second comparative image forming apparatus 2C, thus increasing a location area where the second comparative image forming apparatus 2C is located. A length w of the second comparative electric box 82 may be decreased in the depth direction of the second comparative image forming apparatus 2C to reduce the location area where the second comparative image forming apparatus 2C is located. However, since the second comparative electric box 82 is needed to drive the second comparative image forming apparatus 2C, downsizing of the second comparative image forming apparatus 2C is restricted. If the second comparative electric box 82 extends horizontally, the second comparative electric box 82 may increase a height of the second comparative image forming apparatus 2C. However, the length w of the second comparative electric box 82 is eliminated, reducing the location area where the second comparative image forming apparatus 2C is located.

Referring back to FIG. 1, a description is provided of a construction of the image forming apparatus 2 according to a first example embodiment.

As illustrated in FIG. 1, a width direction X, a depth direction Y, and a height direction Z of the image forming apparatus 2 define directions seen from the user facing a front face serving as an operation face of the image forming apparatus 2, respectively. The electric box 16 is disposed above the output tray 8 and below the scanner 6. The electric box 16 extends substantially horizontally (e.g., horizontally). The electric box 16 includes a controller board (e.g., a control board) that drives the image forming apparatus 2. Since the controller board generates an electric wave, the electric box 16 includes an electric cabinet, contoured into a box defined by a sheet metal or the like, to block the electric wave to shield an outside of the electric box 16 from the electric wave. The electric cabinet accommodates the controller board and the like. Since the electric box 16 is disposed inside an electric box container, the electric box 16 is not visible from an outside of the electric box container.

As illustrated in FIG. 1, the electric box 16 is disposed below the scanner 6 and extended horizontally unlike the second comparative electric box 82 mounted on the rear face of the second comparative image forming apparatus 2C as illustrated in FIG. 4. Accordingly, the electric box 16 eliminates the length w in the depth direction Y depicted in FIG. 1 that is equivalent to the length w of the second comparative electric box 82 in the depth direction of the second comparative image forming apparatus 2C depicted in FIG. 4. Consequently, the electric box 16 reduces a location area where the image forming apparatus 2 is located substantially. Compared to the second comparative electric box 82 depicted in FIG. 4, the electric box 16 depicted in FIG. 1 increases a height of the image forming apparatus 2 by a height of the electric box 16 in the height direction Z. However, since the electric box 16 extends horizontally, the height of the electric box 16 barely degrades the external appearance and operation of the image forming apparatus 2. Since the rear face of the second comparative image forming apparatus 2C depicted in FIG. 4 mounts the electric box 82, the center of gravity of the second comparative image forming apparatus 2C is biased. Conversely, the electric box 16 depicted in FIG. 1 extends horizontally, preventing the center of gravity of the image forming apparatus 2 from being biased.

Figure 5:
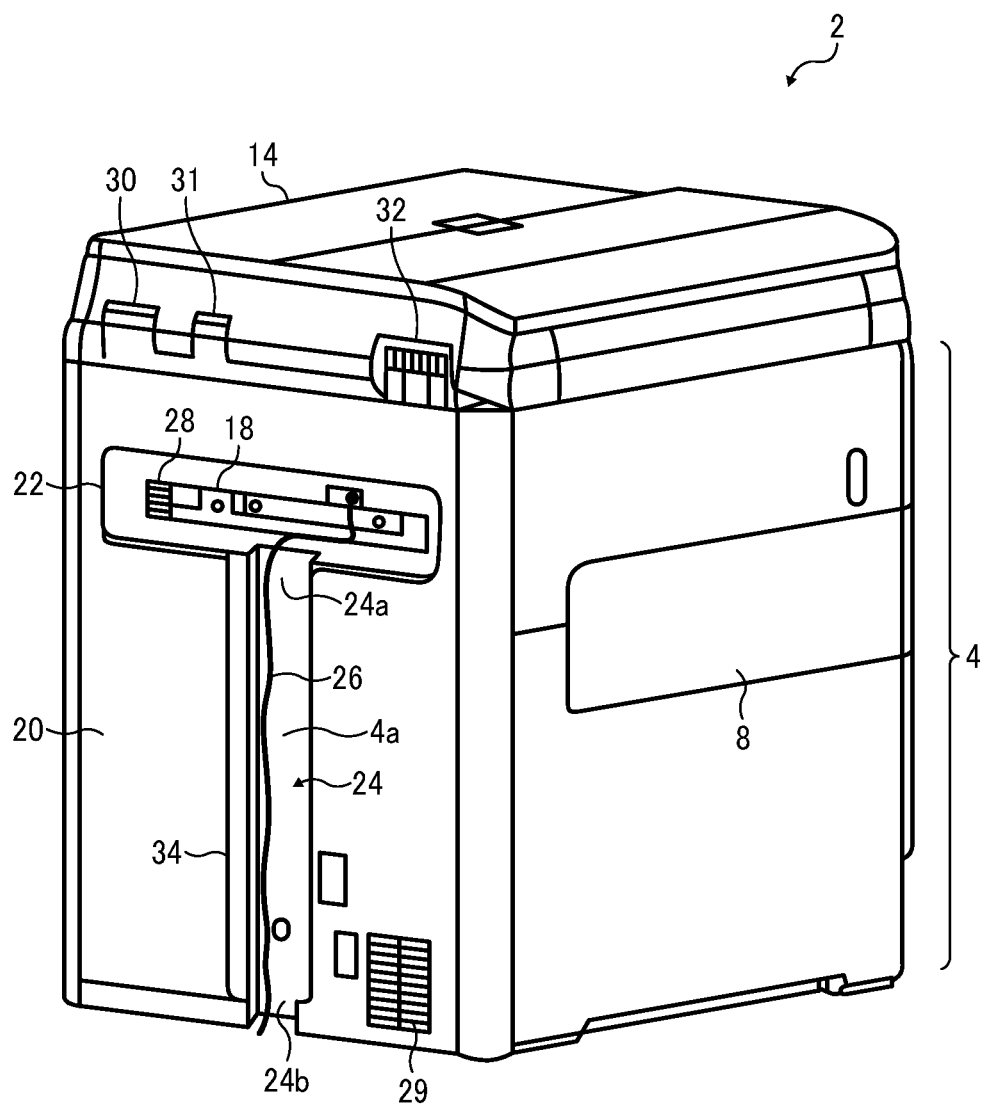
FIG. 5 is a perspective view of the image forming apparatus depicted in FIG. 1 according to a first example embodiment of the present disclosure.

FIG. 5 is a perspective view of the image forming apparatus 2 seen from a rear face 4a of the image forming apparatus 2. As illustrated in FIG. 5, the rear face 4a of the body 4 exposes an interface 18 serving as a wire connector of the controller board of the electric box 16. A rear outer cover 20 serving as an outer cover covers the rear face 4a serving as a body face of the body 4. A horizontal slot 22 serving as a slot extending horizontally penetrates through the rear outer cover 20 and is disposed opposite the interface 18. In a state in which the rear outer cover 20 is attached to the body 4, the service engineer accesses the interface 18 from an outside of the image forming apparatus 2. The rear outer cover 20 includes a wire accommodator 24 that defines a groove, faces the outside of the image forming apparatus 2, and extends in the height direction Z of the body 4. For example, the wire accommodator 24 projects downward from the horizontal slot 22. The wire accommodator 24 accommodates wires (e.g., electric wires) such as a cable and a harness coupled to and extended from the interface 18. An upper portion 24a of the wire accommodator 24 adjoins or communicates with the horizontal slot 22. A lower portion 24b of the wire accommodator 24 adjoins a bottom edge of the image forming apparatus 2 and defines an opening that communicates with the outside of the image forming apparatus 2.

A wire 26 (e.g., an electric wire) coupled to the interface 18 is placed in the wire accommodator 24 serving as an elongate recess such that the wire 26 is not fixedly secured to the wire accommodator 24. Accordingly, the wire 26 is directed in the height direction Z of the body 4 and organized. For example, a plurality of wires 26 is not aligned horizontally and hung down, preventing degradation in the external appearance of the image forming apparatus 2. The interface 18 includes a vent 28. The image forming device 10 depicted in FIG. 1 includes a vent 29. The ADF 14 includes a plurality of hinges 30, 31, and 32 that pivots the ADF 14.

Figure 6:
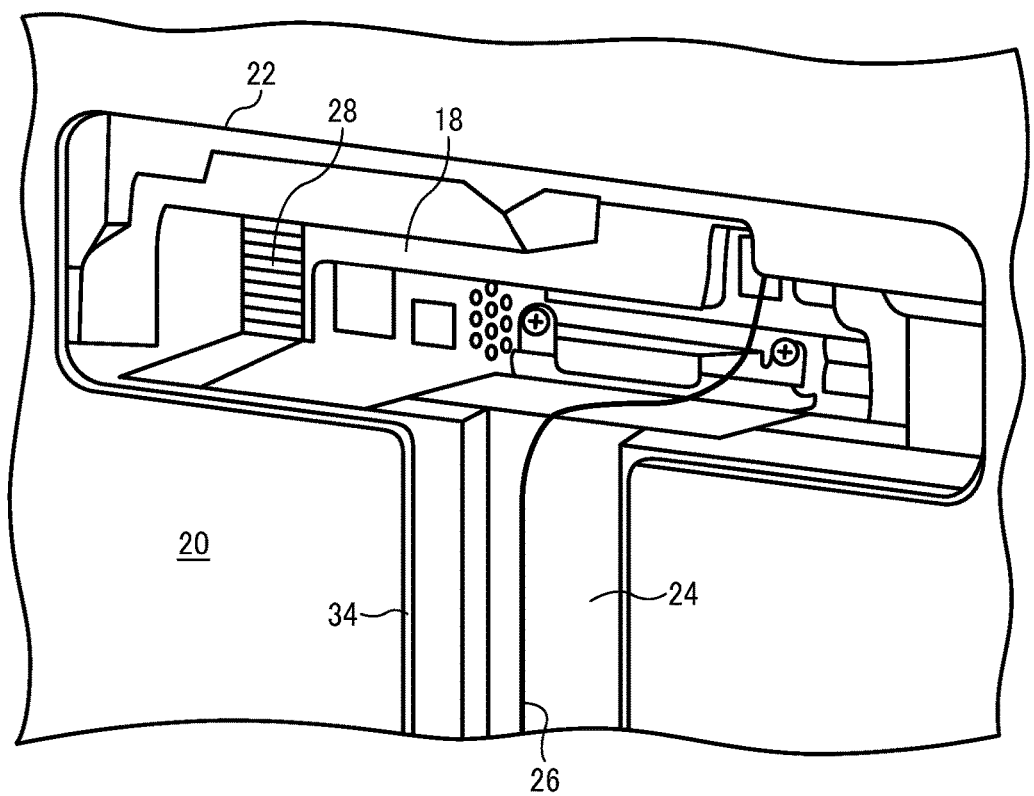
FIG. 6 is an enlarged perspective view of an interface incorporated in the image forming apparatus depicted in FIG. 5 and a periphery of the interface.

FIG. 6 is an enlarged perspective view of the interface 18 and a periphery of the interface 18. The rear outer cover 20 has a double layer structure constructed of an underneath layer and a surface layer. The underneath layer defines the wire accommodator 24 that accommodates the wire 26 and an interface accommodator that accommodates the interface 18. The surface layer defines the horizontal slot 22. The surface layer further defines a vertical slot 34 that adjoins or communicates with the horizontal slot 22. The vertical slot 34 extends along the wire accommodator 24. A width of the vertical slot 34 is greater than a width of the wire accommodator 24 in the width direction X, thus defining a step between the vertical slot 34 and the wire accommodator 24. The step serves as a positioner that restricts entry of a subsidiary cover described below into an interior of the body 4.

Figure 7:
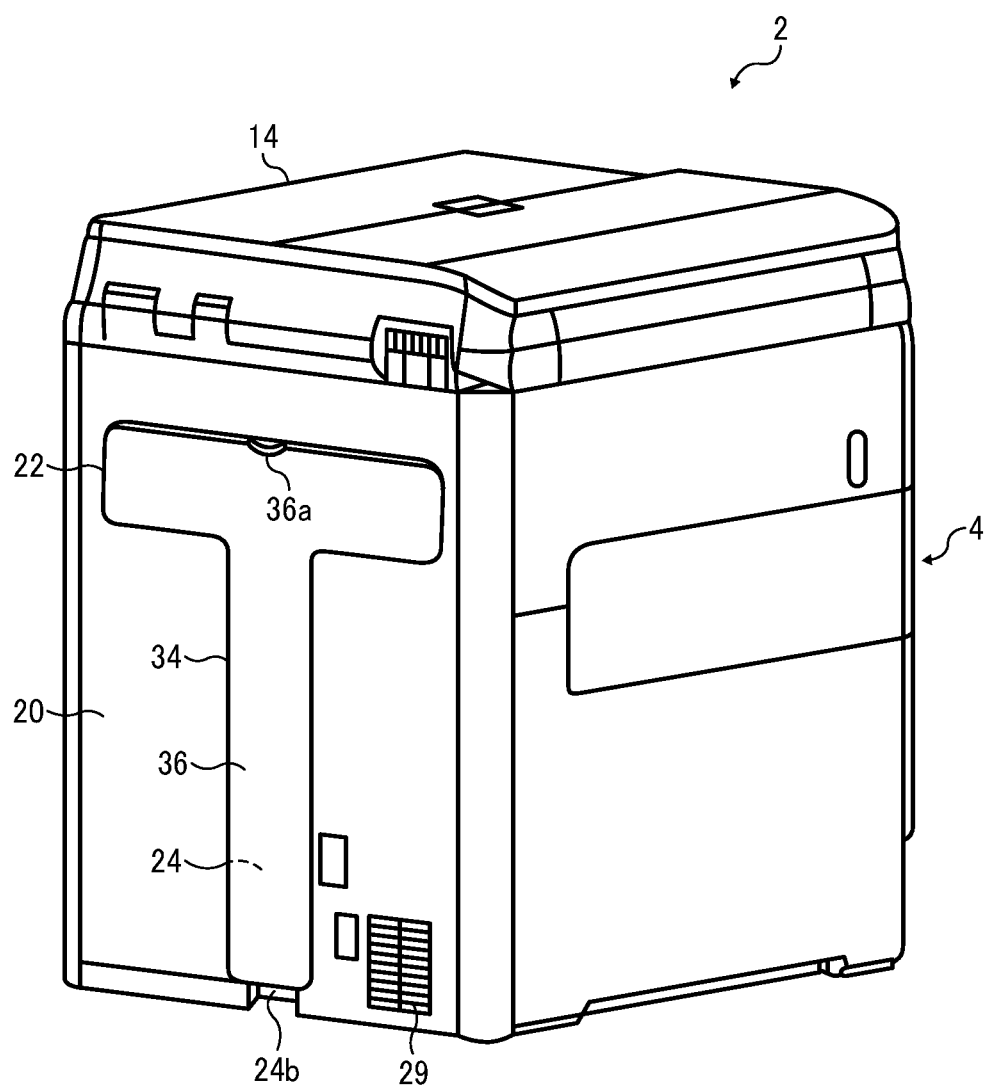
FIG. 7 is a perspective view of the image forming apparatus depicted in FIG. 5, illustrating a rear outer cover incorporated therein.

FIG. 7 is a perspective view of the image forming apparatus 2. As illustrated in FIG. 7, a T-shaped subsidiary cover 36 covers the horizontal slot 22 and the vertical slot 34 (e.g., the wire accommodator 24). The rear outer cover 20 is fastened to the body 4 with screws. Conversely, the subsidiary cover 36 is detachably attached to the rear outer cover 20. The subsidiary cover 36 includes a recess 36a serving as a finger grip. The service engineer attaches and detaches the subsidiary cover 36 to and from the rear outer cover 20 by touching or pulling the recess 36a without using a tool. Alternatively, the subsidiary cover 36 may be attached to the rear outer cover 20 with a hook pawl, a magnet, or a hook-and-loop fastener or with other methods.

In a state in which the subsidiary cover 36 is attached to the body 4 through the rear outer cover 20, that is, in a state in which the subsidiary cover 36 covers the horizontal slot 22 and the vertical slot 34, the wire accommodator 24 also serves as a duct interposed between the interface 18 and the outside of the image forming apparatus 2. Since the lower portion 24b of the wire accommodator 24 that is not covered by the subsidiary cover 36 communicates with the outside of the image forming apparatus 2, the wire accommodator 24 couples the vent 28 of the interface 18 depicted in FIG. 6 to the outside of the image forming apparatus 2. It is requested to locate the interface 18 at a height corresponding to the eyes of the service engineer to allow the service engineer to couple a cable and the like to a controller situated inside the electric box 16 readily. However, since the interface 18 has the vent 28 that exhausts heat generated by the controller, if the interface 18 inhales and exhausts air through the vent 28 while the vent 28 is exposed to the outside of the image forming apparatus 2, the service engineer may be exposed directly to noise, heat, and odor generated from the electric box 16.

To address this circumstance, according to this example embodiment, the subsidiary cover 36 covers the vent 28 of the interface 18 to prevent the service engineer from being exposed to noise, heat, and odor directly. Additionally, although the subsidiary cover 36 covers the vent 28, the vent 28 communicates with the outside of the image forming apparatus 2 through the wire accommodator 24, allowing heat generated by the controller to be exhausted through the wire accommodator 24 smoothly. The subsidiary cover 36 covers the interface 18 and the wire accommodator 24, suppressing adhesion of dust and dirt to the wire 26 (e.g., a cable) compared to a configuration in which the interface 18 and the wire accommodator 24 are not covered by the subsidiary cover 36 and therefore exposed to the outside of the image forming apparatus 2. When the service engineer performs maintenance of the interface 18, the service engineer does not detach the rear outer cover 20 and does detach the subsidiary cover 36 that is smaller in size and lighter in weight than the rear outer cover 20 and is handled more readily than the rear outer cover 20 without using the tool, thus facilitating maintenance.

As illustrated in FIG. 7, the subsidiary cover 36 covers the horizontal slot 22 and the vertical slot 34, enhancing the external appearance of the image forming apparatus 2 and preventing the wire 26 from being damaged accidentally or being disconnected from the interface 18 by some force. Additionally, the subsidiary cover 36 is leveled with the rear outer cover 20 to define an identical flat plane to prevent the subsidiary cover 36 from bulging beyond the rear outer cover 20. Accordingly, the image forming apparatus 2 is located in proximity to a wall or the like of a room, saving space in the location area where the image forming apparatus 2 is located. As air flows in the room, dust, dirt, and the like in the air may adhere to an interior of a duct, for example, the vent 28, staining the vent 28. To address this circumstance, according to this example embodiment illustrated in FIG. 7, the subsidiary cover 36 defining the duct is removed to facilitate cleaning of the entire duct.

Figure 8:
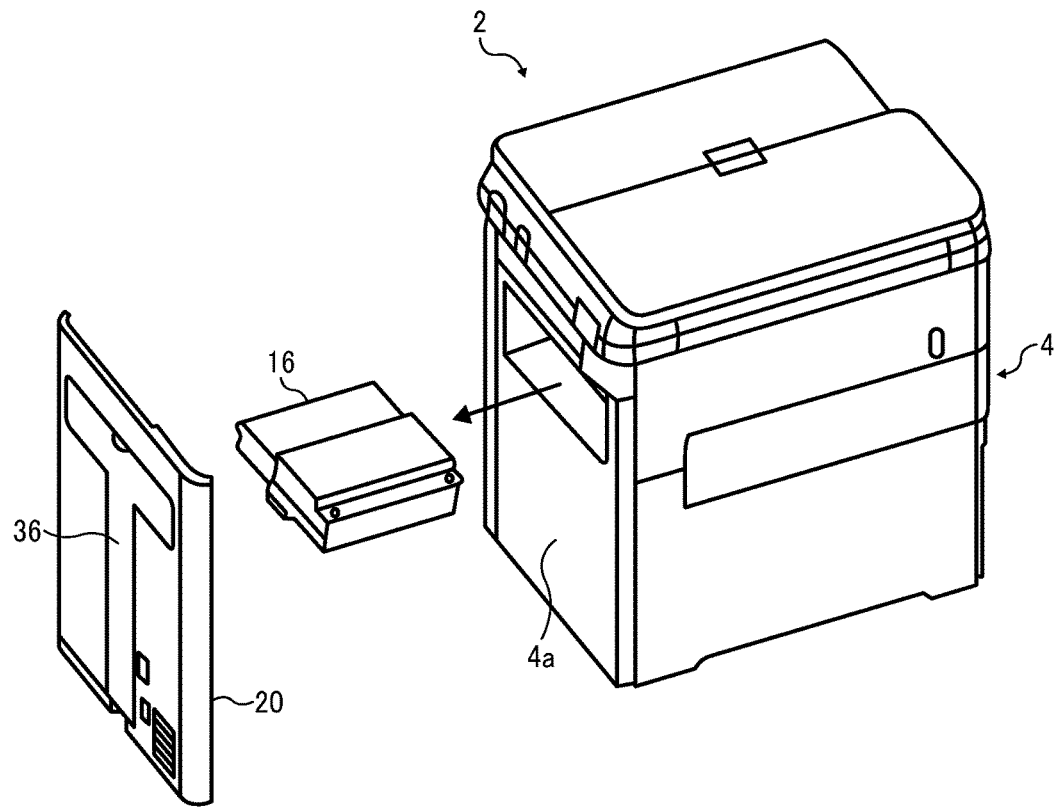
FIG. 8 is an exploded perspective view of the image forming apparatus depicted in FIG. 7, illustrating an electric box detached therefrom.

FIG. 8 is an exploded perspective view of the image forming apparatus 2. As illustrated in FIG. 8, the screws that fasten the rear outer cover 20 to the body 4 are released to detach the rear outer cover 20 from the body 4. Screws that fasten the electric box 16 to the body 4 are released to move the electric box 16 horizontally. Thus, the electric box 16 is removed from the body 4. For example, the rear outer cover 20 is removed and the screws that fasten the electric box 16 to the body 4 are released to slide the electric box 16 without removing the harness. Thus, the electric box 16 is detached from the body 4. Accordingly, the service engineer performs maintenance of the electric box 16 readily. Since the wire 26 (e.g., the harness) is placed in the wire accommodator 24 without being fixedly secured to the wire accommodator 24, removal of the wire 26 is not performed.

Figure 9:
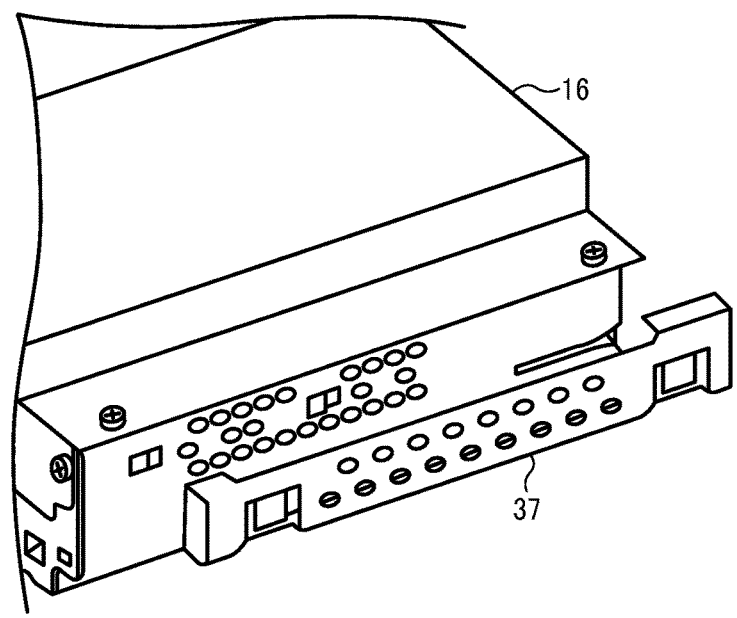
FIG. 9 is a partial perspective view of the electric box depicted in FIG. 8.

FIG. 9 is a partial perspective view of the electric box 16. As illustrated in FIG. 9, the body 4 mounts a rail 37 that engages each lateral end of the electric box 16 in the width direction X depicted in FIG. 1. The electric box 16 slides over the rail 37 smoothly and moves in the depth direction Y.

A description is provided of a construction of an image forming apparatus 2T according to a second example embodiment.

Figure 10:
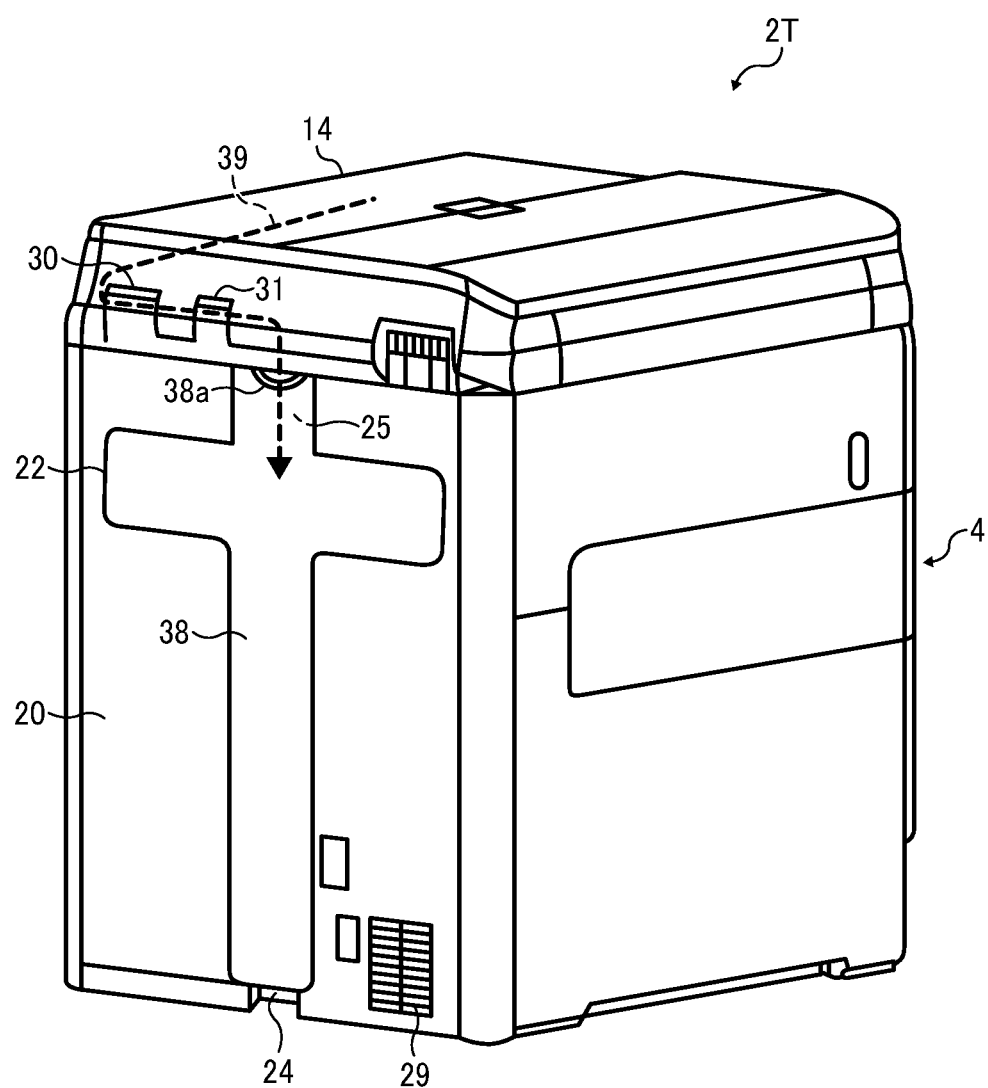
FIG. 10 is a perspective view of an image forming apparatus according to a second example embodiment of the present disclosure.

FIG. 10 is a perspective view of the image forming apparatus 2T. The components of the image forming apparatus 2T according to the second example embodiment that are identical to those of the image forming apparatus 2 according to the first example embodiment are assigned with the identical reference numerals and a description of the construction and the configuration mentioned above is omitted.

As illustrated in FIG. 10, the image forming apparatus 2T includes a recess 25. The recess 25 is disposed opposite the wire accommodator 24 via the horizontal slot 22 in the height direction Z depicted in FIG. 1 and faces an outside of the image forming apparatus 2T. The recess 25 adjoins or communicates with the horizontal slot 22. A shape of the recess 25 may be equivalent to a shape of the wire accommodator 24. A cross-shaped subsidiary cover 38 covers the horizontal slot 22, the wire accommodator 24, and the recess 25. The subsidiary cover 38 is attached to the rear outer cover 20 similarly to the subsidiary cover 36 depicted in FIG. 7. If a card reader is optionally disposed in front of the ADF 14, a harness 39 coupled to the card reader is extended through the hinges 30 and 31 of the ADF 14 and inserted into the interface 18 as indicated by a dotted arrow in FIG. 10.

With the T-shaped subsidiary cover 36 depicted in FIG. 7, the harness 39 extended through the hinges 30 and 31 enters the body 4. The harness 39 is extended through a through-hole produced in a portion of the body 4 that is retreated from the T-shaped subsidiary cover 36 and directed to the horizontal slot 22. Conversely, with the cross-shaped subsidiary cover 38 depicted in FIG. 10, the harness 39 is directed to the horizontal slot 22 through the recess 25. Hence, it is not necessary to produce a through-hole in a portion of the body 4 that is retreated from the cross-shaped subsidiary cover 38. Additionally, an upper end face of the subsidiary cover 38 disposed opposite the recess 25 is leveled with an upper end face of the rear outer cover 20. Accordingly, the harness 39 is pulled into the recess 25 through a recess 38a serving as a finger grip from the ADF 14 directly without being placed on an outer face of the rear outer cover 20. Like the wire accommodator 24 of the image forming apparatus 2 according to the first example embodiment depicted in FIG. 7, the wire accommodator 24 of the image forming apparatus 2T according to the second example embodiment depicted in FIG. 10 also serves as a duct.

The present disclosure is not limited to the details of the example embodiments described above and various modifications and improvements are possible. The advantages achieved by the example embodiments described above are examples and therefore are not limited to those described above.

A description is provided of advantages of the image forming apparatuses 2, 2S, and 2T.

As illustrated in FIGS. 1, 2, 3, 5, and 10, an image forming apparatus (e.g., the image forming apparatuses 2, 2S, and 2T) includes a body (e.g., the body 4) that accommodates a scanner (e.g., the scanner 6), a sheet receiver (e.g., the output tray 8), an electric box (e.g., the electric box 16), and an outer cover (e.g., the rear outer cover 20). The scanner is disposed in an upper portion of the body. The sheet receiver is disposed below the scanner. The electric box is disposed above the sheet receiver and below the scanner and extended horizontally with respect to the scanner. As illustrated in FIG. 5, the electric box includes a wire connector (e.g., the interface 18) covered by the outer cover. The outer cover includes a slot (e.g., the horizontal slot 22) and a wire accommodator (e.g., the wire accommodator 24). In a state in which the outer cover is attached to the body, the slot exposes the wire connector to an outside of the image forming apparatus such that the wire connector is accessible from the outside of the image forming apparatus. The wire accommodator accommodates an electric wire (e.g., the wire 26) coupled to the wire connector.

Accordingly, the image forming apparatus incorporating the electric box extended horizontally facilitates maintenance of the electric box and prevents the wire from being hung down, suppressing degradation in the external appearance of the image forming apparatus.

The present disclosure has been described above with reference to specific example embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative example embodiments may be combined with each other and/or substituted for each other within the scope of the present disclosure.

What is claimed is:

1. An image forming apparatus, comprising:
an electric wire;
an electric box extending substantially horizontally and including a wire connector coupled to the electric wire;
a body face exposing the wire connector; and
an outer cover configured to cover the body face, the outer cover including
a slot, the slot opposite the wire connector, the slot configured to expose the wire connector to an outside of the image forming apparatus, and
a wire accommodator configured to accommodate the electric wire,
wherein the wire accommodator projects downward from the slot,
wherein the wire accommodator includes a groove facing the outside of the image forming apparatus,
wherein the wire accommodator includes an upper portion adjoining the slot,
wherein the image forming apparatus further includes a subsidiary cover, the subsidiary cover detachably attached to the outer cover, the subsidiary cover configured to cover the slot and the wire accommodator.

2. The image forming apparatus according to claim 1, wherein the subsidiary cover includes a finger grip with which the subsidiary cover is attached to and detached from the outer cover.

3. The image forming apparatus according to claim 1, wherein the subsidiary cover is T-shaped.

4. The image forming apparatus according to claim 1, wherein the wire connector includes a vent to exhaust heat, and
wherein the wire accommodator includes a lower portion not covered by the subsidiary cover to define an opening that communicates with the outside of the image forming apparatus.

5. The image forming apparatus according to claim 1, wherein the wire accommodator includes a duct interposed between the wire connector and the outside of the image forming apparatus in a state in which the subsidiary cover covers the slot and the wire accommodator.

6. The image forming apparatus according to claim 1, wherein the outer cover further includes a recess being disposed opposite the wire accommodator via the slot and facing the outside of the image forming apparatus, and wherein the recess adjoins the slot.

7. The image forming apparatus according to claim 6, wherein the subsidiary cover further covers the recess.

8. The image forming apparatus according to claim 7, wherein the subsidiary cover is cross-shaped.

9. The image forming apparatus according to claim 7, wherein the wire accommodator includes a duct interposed between the wire connector and the outside of the image forming apparatus in a state in which the subsidiary cover covers the slot, the wire accommodator, and the recess.

10. The image forming apparatus according to claim 7, further comprising:
a body including:
a sheet receiver to receive a sheet; and
a scanner, disposed above the sheet receiver, to read an image on an original,
wherein the electric box is disposed above the sheet receiver and below the scanner and extended substantially horizontally with respect to the scanner.

11. The image forming apparatus according to claim 10, further comprising:
an auto document feeder, disposed above the scanner, to feed the original to the scanner; and a harness extending from the auto document feeder and directed to the slot through the recess.

12. The image forming apparatus according to claim 1, wherein the electric box is moved substantially horizontally and detached from the image forming apparatus in a state in which the outer cover is detached from the image forming apparatus.

13. The image forming apparatus according to claim 12, further comprising a rail over which the electric box slides.

14. An image forming apparatus, comprising:
an electric box extending substantially horizontally and including a wire connector configured to be coupled to an electric wire;
a body face exposing the wire connector;
an outer cover configured to cover the body face, the outer cover including a slot and a wire accommodator, the slot opposite the wire connector, the slot configured to expose the wire connector to an outside of the image forming apparatus, the wire accommodator configured to accommodate the electric wire; and a subsidiary cover detachably attached to the outer cover, the subsidiary cover configured to cover the slot and the wire accommodator, wherein the wire accommodator projects downward from the slot, wherein the wire accommodator includes a groove facing the outside of the image forming apparatus, wherein the wire accommodator includes an upper portion adjoining the slot.

15. The image forming apparatus according to claim 14, wherein the subsidiary cover includes a finger grip with which the subsidiary cover is attached to and detached from the outer cover.

16. The image forming apparatus according to claim 14, wherein the subsidiary cover is T-shaped.

17. The image forming apparatus according to claim 14, wherein the wire connector includes a vent to exhaust heat, and wherein the wire accommodator includes a lower portion not covered by the subsidiary cover to define an opening that communicates with the outside of the image forming apparatus.

18. The image forming apparatus according to claim 14, wherein the wire accommodator includes a duct interposed between the wire connector and the outside of the image forming apparatus in a state in which the subsidiary cover covers the slot and the wire accommodator.

19. The image forming apparatus according to claim 14, wherein the outer cover further includes a recess being disposed opposite the wire accommodator via the slot and facing the outside of the image forming apparatus, and wherein the recess adjoins the slot.

20. The image forming apparatus according to claim 14, wherein the electric box is moved substantially horizontally and detached from the image forming apparatus in a state in which the outer cover is detached from the image forming apparatus.

* * * * *